United States Patent [19]

Fowler

[11] Patent Number: 4,740,224

[45] Date of Patent: Apr. 26, 1988

[54] TERMINAL CONNECTION FOR FIBER GLASS BUSHING

[75] Inventor: Samuel R. Fowler, Tuscon, Ariz.

[73] Assignee: Manville Corporation, Denver, Colo.

[21] Appl. No.: 908,752

[22] Filed: Sep. 18, 1986

Related U.S. Application Data

[63] Continuation-in-part of Ser. No. 820,475, Jan. 17, 1986, abandoned.

[51] Int. Cl.$^4$ ............................................. C03B 37/02
[52] U.S. Cl. .................................... 65/1; 65/DIG. 4; 219/10.81
[58] Field of Search ........................... 65/1, 2, DIG. 4; 219/10.81

[56] References Cited

U.S. PATENT DOCUMENTS

| | | | |
|---|---|---|---|
| 3,512,948 | 5/1970 | Glaser et al. | 65/1 |
| 4,026,689 | 5/1977 | Higginbotham | 65/1 |
| 4,272,271 | 6/1981 | Thompson | 65/1 |
| 4,348,217 | 9/1982 | Williamson et al. | 65/2 |

FOREIGN PATENT DOCUMENTS

| | | | |
|---|---|---|---|
| 623836 | 9/1978 | U.S.S.R. | 65/1 |
| 908753 | 2/1982 | U.S.S.R. | 65/1 |
| 1013426 | 4/1983 | U.S.S.R. | 65/1 |

*Primary Examiner*—Robert L. Lindsay
*Attorney, Agent, or Firm*—John D. Lister; Cornelius P. Quinn; Timothy R. Schulte

[57] ABSTRACT

A lightweight, precious metal containing, glass fiberizing bushing having a novel power terminal ear arrangement is disclosed. The novel terminal ear arrangement has two relatively thin ears which extend from an area located near the midpoint of each end wall of the bushing, their elongated bases lying generally in the same plane and being generally parallel to the bottom wall of the bushing. The thin ears are spaced a relatively great distance apart but yet are relatively wide. This arrangement minimizes precious metal usage but still provides uniform heating of the molten glass within the bushing.

7 Claims, 1 Drawing Sheet

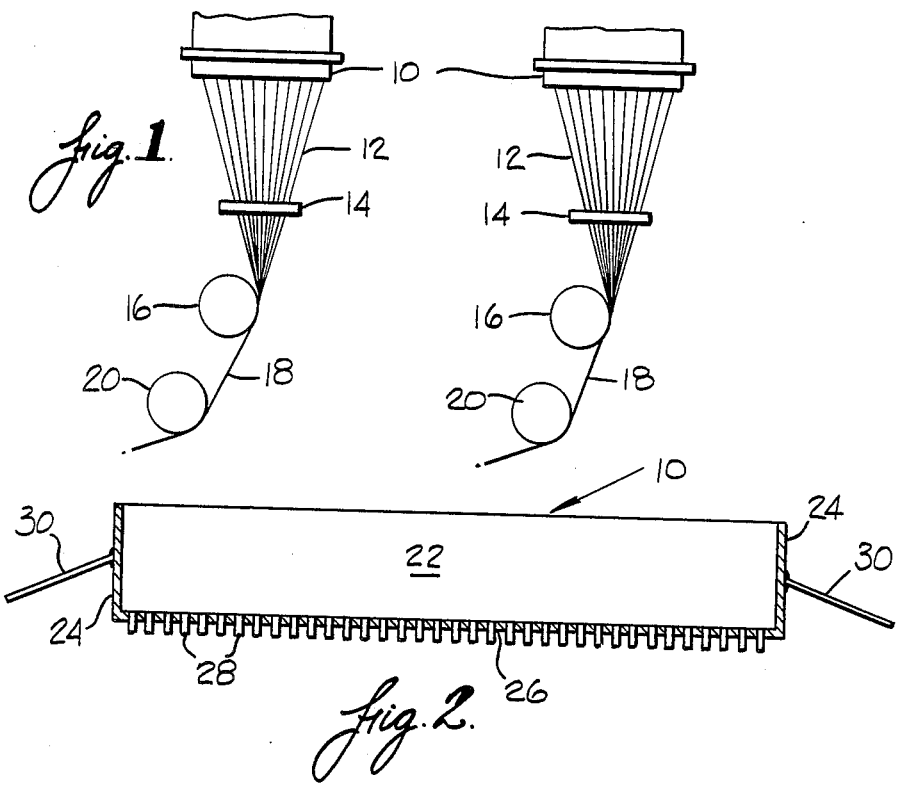
Fig. 1.
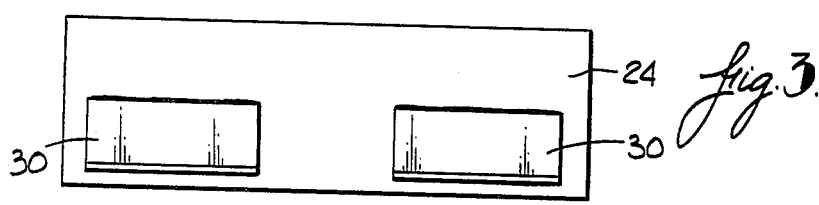
Fig. 2.
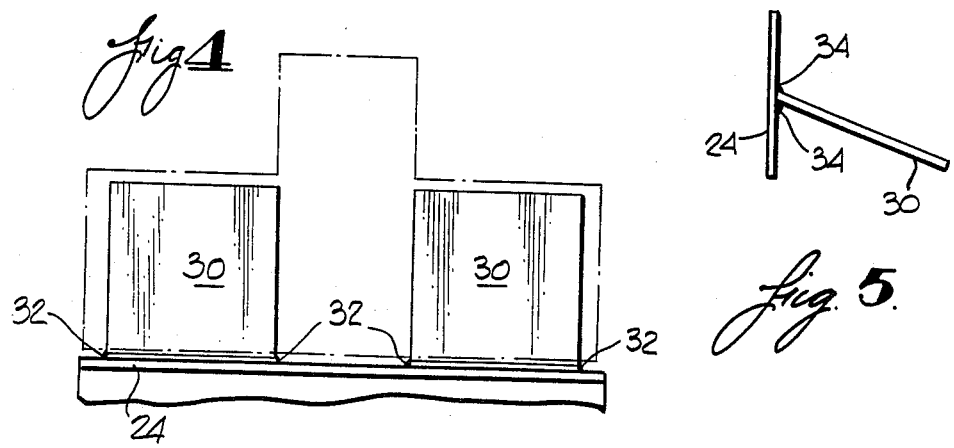
Fig. 3.
Fig. 4.
Fig. 5.

TERMINAL CONNECTION FOR FIBER GLASS BUSHING

CROSS-REFERENCE TO A RELATED APPLICATION

This application is a continuation-in-part of U.S. patent application Ser. No. 820,475, filed Jan. 17, 1986 now abandoned.

FIELD OF THE INVENTION

This invention relates to an improved terminal connection for delivering power to a bushing used in the production of glass fiber.

BACKGROUND OF THE PRIOR ART

In the manufacture of fiber glass strands, molten glass is fed into bushings having a large number of holes or tips through which glass filaments are drawn, then attenuated to the desired fiber diameter. The fibers are gathered together into strands which are fed to a winder, where they are formed into a package, or to a chopper where the strands are cut into lengths for later use in the manufacture of reinforced plastics or fiber glass mats.

It is of course desirable to produce fibers at as high a production rate as possible, but this is significant only to the extent that the production line as a whole can utilize the fiber output. For example, if the chopper cannot handle an excessively high rate of strand delivery the effective production rate of the entire line is limited to the speed at which the chopper can operate. Similarly, if the bushings are capable of producing fibers at a high production rate but are plagued with problems of hangups or stoppage of a filament normally issuing from a bushing, the overall production rate of the manufacturing process suffers.

The latter problem has faced the industry for years and is recognized as being caused to a large extent by the inability to maintain a uniform operating temperature within the electrically heated bushing. Typically, the ends of the bushing are not as hot as the center, although at times, depending on the pattern of the power input to the bushing, the reverse may be the case. In any event, the result of uneven power distribution is uneven heating of the bushing, causing glass filaments to begin issuing from the hottest part of a bushing being started up well before they issue from the coldest part. Since the fibers formed from a bushing are not fed into the strand forming section until all the tips of the bushing are producing filaments, the time spent waiting for all parts of the bushing to be heated to the operating temperature is lost production time.

A number of attempts have been made over the years to better control the temperature of the molten glass within the bushing. These have included, for example, controllers for changing the power input in response to detected temperature variations (U.S. Pat. No. 4,285,712); the addition of electrically conductive material to a bushing flange to cause increased current flow in these areas (U.S. Pat. No. 4,272,271); the use of separate vertically spaced electric terminals to control flow resistance ratios between the heater screen and the bottom bushing wall (U.S. Pat. No. 4,436,541); controlling the flow of molten glass within the bushing by means of baffles (U.S. Pat. No. 3,628,930)' varying the wall thickness of the bushing (U.S. Pat. No. 3,511,916); and controlling the heating of the bottom corners of the bushing by establishing a line of equipotential across the end wall of the bushing (U.S. Pat. No. 3,512,948). None of these arrangements for regulating the temperature of the molten glass has been very satisfactory, particularly from the point of view of providing a very simple, inexpensive, yet reliable bushing control.

Moreover, the problem of controlling glass temperature within the bushing has been particularly troublesome with bushings made from less precious metal (i.e. platinum and rhodium). Bushings containing less precious metal are desirable because even though all precious metal bushings are recycled when spent to recover the precious metal some metal is always lost during the recycling process. Accordingly, it would be highly desirable to provide a better means for controlling the temperature of molten glass in an electrically heated bushing which can be made from less precious metal and yet meet the criteria of simplicity and reliability.

SUMMARY OF THE INVENTION

This invention addresses the problems enumerated above by providing a novel, relatively shallow, electrically conductive, precious metal bushing which can be made using significantly less precious metal than those of the prior art. The bushing employs two novel, relatively thin, electrically conductive terminal ear portions on each end wall of the bushing. The bases of the ear portions lie in substantially the same plane and are substantially parallel to the bottom wall of the bushing. The bases are also connected to an end wall of the bushing at a location near the end wall's midpoint as such is measured from the bushing's bottom wall to the top of the end wall. The ear portions are also spaced apart from each other a distance which preferably is at least equal to one half the width of an ear portion. This simple terminal design is able to supply current in such a pattern that the variation in temperature from one point in the bushing to another is significantly less than that experienced by applicants with conventional bushings. Accordingly, the problems caused by excessive temperature variations between the center and ends of the bushing are virtually eliminated. In addition, the new terminal runs relatively cool, thereby extending its life greatly compared to the commonly used thick vertical terminal lug of the prior art. Moreover, this bushing and terminal design is made with significantly less precious metal than conventional bushings, up to 20% less than the conventional bushings employing the thick, vertically oriented lugs.

The various features of the invention and the benefits thereof will be made more clear in the following detailed description of the invention.

BRIEF DESCRIPTION OF THE DRAWINGS

FIG. 1 is a diagrammatic view of a typical bushing assembly used in the production of fiber glass strands;

FIG. 2 is a sectional view taken along the length of a bushing incorporating the terminal connection of the present invention;

FIG. 3 is an end view of the bushing of FIG. 2;

FIG. 4 is a partial plan view of the bushing of FIG. 2, showing the terminal connection arrangement of the invention; and FIG. 5 is an enlarged side elevation of the side wall, incorporating the terminal connection of the present invention.

DESCRIPTION OF THE INVENTION

Referring to the drawings, FIG. 1 diagrammatically shows a typical arrangement of a plurality of fiber forming direct melt bushings 10 into which molten glass is delivered from a forehearth, not shown. Although only two bushings are shown, it should be understood that many more bushings than that normally operate simultaneously to provide fiber for a chopping or winding operation. Molten glass filaments 12 are extruded through orifices in the bushings and are drawn over sizing applicators 14 to gathering wheels 16 which form the filaments into strands 18. Guide wheels 20 guide the strands to a chopper or winding mechanism, not shown, which forms no part of the invention.

Referring to FIG. 2, bushing 10 is shown as comprising side walls 22, end walls 24 and bottom wall 26, all of which are formed of suitable electrically conductive material, such as a platinum/rhodium alloy. Tubular tips 28 extend from small holes in bottom wall 26 through which molten glass flows to form filaments. Since the bushing commonly incorporates a great many holes, well over 1000 not being uncommon, the need for constant temperature control of the molten glass temperature in order to have stable flow conditions throughout the bushing can readily be appreciated. As shown, terminal ear portions 30 extend from the end walls 24 at a downward slope. To permit easy attachment of power delivery clamps and to prevent the clamps from falling off the bushing, the ear portions may be bent (not shown). Such a bend can be made across the ear's midsection in a direction whereby the bend is substantially parallel to the end walls. The outer portion of such a bent ear would lie in a plane which is substantially parallel to bottom wall 26. Lines or notches could also be lightly machined into the surface of the bent ear's outer portion, thereby making it easy for an operator to see and record the power delivery clamp's exact location on the ear. The bushing may also incorporate other hardware which has not been shown since it forms no part of the invention. For example, cooling tubes and structural members commonly employed may be used even though not shown.

Referring to FIG. 3, terminal ears 30 can be seen to be spaced from each other a relatively great distance and from the corners between the side and end walls a relatively short distance. This arrangement has been found to provide an even distribution of heat to all points within the bushing, including the corners as well as the more centrally located areas. Apparently, by introducing current at the outermost edges of the ears heating occurs at distances extending still farther outwardly of the outermost edges, resulting in the even distribution of heat across the width of the bushing. Best results have been found to occur when the distance or spacing between the ears is less than the width of an ear but greater than one-half the width of an ear. For example, with 1¾ inch wide ears, best results were obtained with a spacing between the ears of 1⅜ inches. With this arrangement, the ears were also spaced ¼ inch from the ends of the end wall.

This arrangement is more clearly shown in FIG. 4, which shows a plan view of the end wall. In this view, a suitable clamp for connecting the power source, not shown, to the terminal ears is illustrated in phantom. Note that the large surface area of the terminal ears permits a large surface area contact with the clamp. This provides more uniform heating since a small terminal-to-clamp contact surface tends to cause a hot spot in the adjacent portion of the bushing's bottom wall. In the previously mentioned bushing having 1¾ inch wide ears, surface contact between the clamp and ear was approximately three square inches per ear.

As shown in FIGS. 4 and 5, each ear is welded to an end wall 24 near the end wall's midpoint, preferably slightly above the midpoint as such is measured from the bushing's bottom wall to the top of the end wall. (see numerals 32 and 34) It has been found that this location is, in fact, critical to uniform current flow and bushing heating. In fact, it has been found that movement of the ears more than a ¼ inch away from this midpoint location can significantly alter current flow patterns and therby interfere with uniform heating. The exact location of the ear around the midpoint will undoubtedly vary with different bushing designs and some experimentation will generally be necessary to find the optimum location. However, such experimentation should not be undue for an experimenter skilled in the relevant art and having knowledge of the present invention.

The ear portions of the present invention are also relatively thin compared to the thick, vertically oriented terminal lugs coventionally used. For example, the thickness of the previously mentioned 1¾ inch wide ear portions was only 0.125 inches which is quite thin particularly when compared to the conventional thick, vertically oriented terminal lugs which typically are 0.300 inches thick. Moreover, preliminary testing indicates that ear portions as thin as 0.060 inches on a similarly sized bushing may also work. Accordingly, those skilled in the relevant art will appreciate that ears 30 of the present invention require considerably less precious metal (i.e. up to 20% less) than the conventional thick vertical terminal lugs. In addition, because they are thinner, the ears of the present invention are significantly easier to weld to the end walls. Moreover, the welds thus obtained are significantly more uniform and have fewer voids than the thicker vertical lugs conventionally employed. Accordingly, current flow and bushing heating are significantly more uniform. In addition, with thinner ears it has also been possible to use thinner end walls. For example, good heating results were obtained with the 1¾ inch wide-0.125 inch thick ears on an end wall only 0.080 inches thick. This is significantly thinner than the end wall used with the conventional thick, vertically oriented lug which typically is 0.250 inches thick.

Returning to FIGS. 3 and 5, it can be seen that the elongated bases of ears 30 lie in the same plane and extend substantially parallel to the bottom wall, or in other words to the bottom of the end wall 24. This also contributes to the evenness of heat supplied to the molten glass in the bushing.

The location of the clamp on the terminal ears can vary depending upon the desired temperature pattern. In general, as previously mentioned, the more surface contact between the clamp and the ears the more consistent the heating will be. Within that general goal, adjustments can be made to determine the best location for the particular type of performance desired. By moving the clamp closer to the end wall, the center will be relatively hotter and the ends cooler. By adjusting it in the other direction, the converse is true. It is also possible to cock the clamp on the ears with the dual ear design of the present invention. That is, the clamp may be moved in towards the end wall on one ear and away from the end wall on the other ear. This allows an operator to change the current flow pattern which may be necessary in some situations for uniform heating.

Heating tests were conducted on an unmounted bushing made from 159 troy ounces of 80/20 platinum/rhodium alloy. The bushing was approximately 1 and 11/16 inches high, 17½ inches long and 5⅞ inches wide. The side walls were approximately 0.020 inches thick and bottom wall or tip plate was 0.060 inches thick. The end walls and terminal ears had the aforementioned dimensions. The bushing's weight of 159 troy ounces made it significantly lighter (and thus less expensive) than the conventional bushing of similar capacity which typically contains 217 troy ounces of precious metal (i.e. the bushing employing the thick, vertically oriented terminal lugs).

Moreover, in the heating tests the temperature never deviated more than 40 degrees F. from any point in the bushing to any other. In addition, the maximum deviation from the target temperature at any point Dn the bushing was found to be just 30° F. The temperatures at the corners were constant and the same as the temperature at the center of the bushing. This was especially impressive considering the fact that the bushing insulation which would normally be in place during heating of an actual installation was not present to aid in smoothing out temperature extremes.

One way the operators on the production line have of determining the merits of a heating system is to "profile" the bushing, which simply means to break out the filaments during operation and see how the new filaments fall. If they all fall together, the bushing is being heated uniformly within the proper temperature range. If the middle of the bushing is running hotter than the ends, the filaments from the middle section will fall soon after breaking, but the filaments from the end sections may take quite a long time to drop, perhaps 15-20 minutes or so. The way this usually is corrected is to adjust the power connections to cool the center of the bushing, to allow the end sections to run at about the same temperature as the center. Conversely, if the ends are running at proper temperature but the center is not, the filaments from the end sections will drop first and those from the center will lag. Then an adjustment to the ends is necessary in order to operate the bushing more uniformly. With the arrangement of the present invention, operation of the bushing was so uniform and within the desired operating temperature range that a profiling of the bushing resulted in all the filaments restarting in only 15 seconds. Further, the running time of a bushing before a filament hangup or blockage occurs is now greatly increased, resulting in more efficient production.

It should now be obvious that the invention provides even bushing temperature control with a highly effective yet extremely economical bushing. It should further be obvious that although a preferred embodiment of the invention has been described, certain specific details of the design can be changed without departing from the spirit of the invention.

What is claimed is:

1. A shallow, lightweight, electrically heated, precious metal bushing for use in producing glass fibers, comprising:
   a bottom wall containing orifices through which molten glass flows in the formation of glass filaments,
   two side walls and two end walls connected to and extending upwardly from the bottom wall,
   the bottom, side and end walls being electrically conductive, and
   two electrically conductive, relatively thin terminal ear portions extending outwardly from each end wall for connection to an electrical power source, each ear portion having an inner edge spaced a relatively long distance from the inner edge of the adjacent ear portion, each ear portion further having an elongated base connected to the end wall from which it extends, said elongated base being connected to the end wall at a location near the end wall's midpoint as measured from the bottom wall to the top of the end wall, the elongated bases of the ear portions lying in substantially the same plane and being substantially parallel to the bottom wall of the bushing.

2. A bushing according to claim 1, wherein the ear portions extending outwardly from the end wall lie in a plane forming an angle less than 90° with the end wall, whereby the ear portions slope outwardly and downwardly from the bushing.

3. A bushing according to claim 1, wherein the ear portions are of similar dimensions and wherein the inner edges of the ear portions extending from an end wall are spaced apart a distance greater than one-half the width of an ear portion but less than the full width thereof.

4. A bushing according to claim 1, wherein the elongated base of each ear portion has an outer edge spaced a relatively short distance from the nearest side wall.

5. A bushing according to claim 1, wherein each ear portion is structurally independent of the adjacent ear portion.

6. A bushing according to claim 1, wherein the elongated base of each ear portion is connected to the end wall slightly above the midpoint of the end wall as measured from the bottom wall to the top of the end wall.

7. A bushing according to claim 1 wherein each ear portion is bent across its midsection.

* * * * *